(12) United States Patent
Bastesen et al.

(10) Patent No.: US 9,835,270 B2
(45) Date of Patent: Dec. 5, 2017

(54) PIPELINE TERMINATION ARRANGEMENT

(71) Applicant: VETCO GRAY SCANDINAVIA AS, Sandvika (NO)

(72) Inventors: Rolf Bastesen, Akerhus (NO); Staale Svindland, Oppland (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 15/320,740

(22) PCT Filed: Jun. 22, 2015

(86) PCT No.: PCT/EP2015/063950
§ 371 (c)(1),
(2) Date: Dec. 20, 2016

(87) PCT Pub. No.: WO2015/197539
PCT Pub. Date: Dec. 30, 2015

(65) Prior Publication Data
US 2017/0130871 A1    May 11, 2017

(30) Foreign Application Priority Data
Jun. 23, 2014 (NO) .................................. 20140833

(51) Int. Cl.
F16L 3/00        (2006.01)
F16L 1/26        (2006.01)
E21B 43/013      (2006.01)

(52) U.S. Cl.
CPC .............. *F16L 3/00* (2013.01); *E21B 43/013* (2013.01); *F16L 1/26* (2013.01)

(58) Field of Classification Search
CPC .............. F16L 1/26; F16L 3/00; E21B 43/013
See application file for complete search history.

(56) References Cited

U.S. PATENT DOCUMENTS 5,857,715 A  *  1/1999  Gray ....................... F16L 55/46
                                              15/104.061
6,142,708 A    11/2000  Tarlton et al.
(Continued)

FOREIGN PATENT DOCUMENTS

EP    1 281 017 B1    11/2005
GB    2 478 548 A      9/2011
(Continued)

OTHER PUBLICATIONS

Office Action issued in connection with corresponding NO Application No. 20140833 dated Jan. 19, 2015.
(Continued)

*Primary Examiner* — Benjamin Fiorello
(74) *Attorney, Agent, or Firm* — GE Global Patent Operation

(57) ABSTRACT

A pipeline termination arrangement to be mounted to a pipeline end section to support a pipeline hub of the pipeline end section during and after a subsea connection of the pipeline hub to a spool piece hub fixed to a spool piece termination structure is provided. The pipeline termination arrangement includes a landing structure for supporting the spool piece termination structure; a connection porch fixed to the landing structure; and a support structure which is fixed to the pipeline end section and provided with a guide frame. The guide frame slidably supports the landing structure so as to allow the landing structure and the connection porch to slide along the guide frame from a first position, in which the connection porch is located in front of and at a distance from the pipeline hub, to a second position, in which the connection porch is in contact with the pipeline hub.

9 Claims, 6 Drawing Sheets

(56) References Cited

U.S. PATENT DOCUMENTS

| | | | |
|---|---|---|---|
| 7,402,000 B2 | 7/2008 | Bastesen et al. | |
| 2003/0049076 A1* | 3/2003 | Bekkevold | F16L 1/26 405/170 |
| 2007/0269270 A1* | 11/2007 | Bastesen | F16L 1/26 405/170 |
| 2010/0021238 A1* | 1/2010 | Mogedal | F16L 1/26 405/169 |
| 2012/0199358 A1* | 8/2012 | Larsson | E21B 43/0107 166/341 |
| 2013/0039701 A1* | 2/2013 | Mille | F16L 1/18 405/166 |

FOREIGN PATENT DOCUMENTS

| | | | |
|---|---|---|---|
| WO | 2004/106696 A1 | 12/2004 | |
| WO | 2006/005994 A1 | 1/2006 | |

OTHER PUBLICATIONS

International Search Report and Written Opinion issued in connection with corresponding PCT Application No. PCT/EP2015/063950 dated Sep. 14, 2015.

* cited by examiner

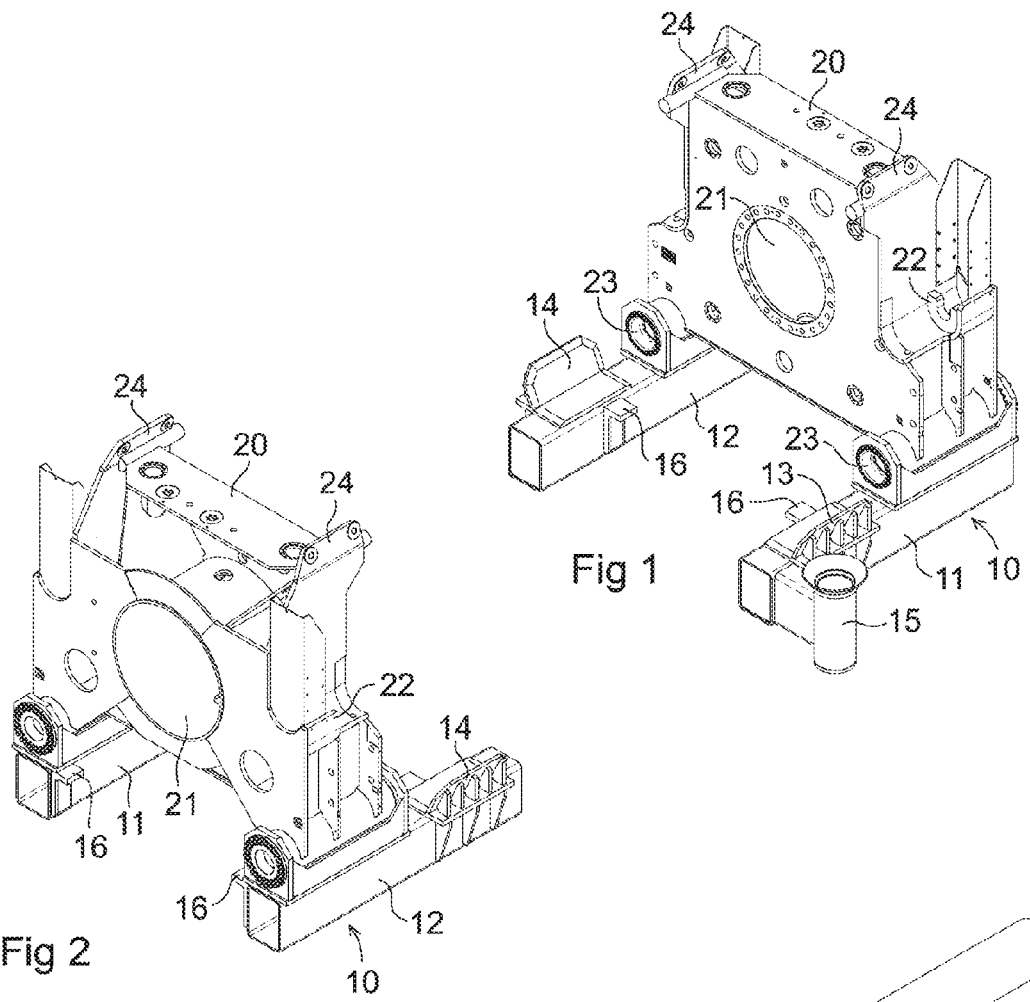
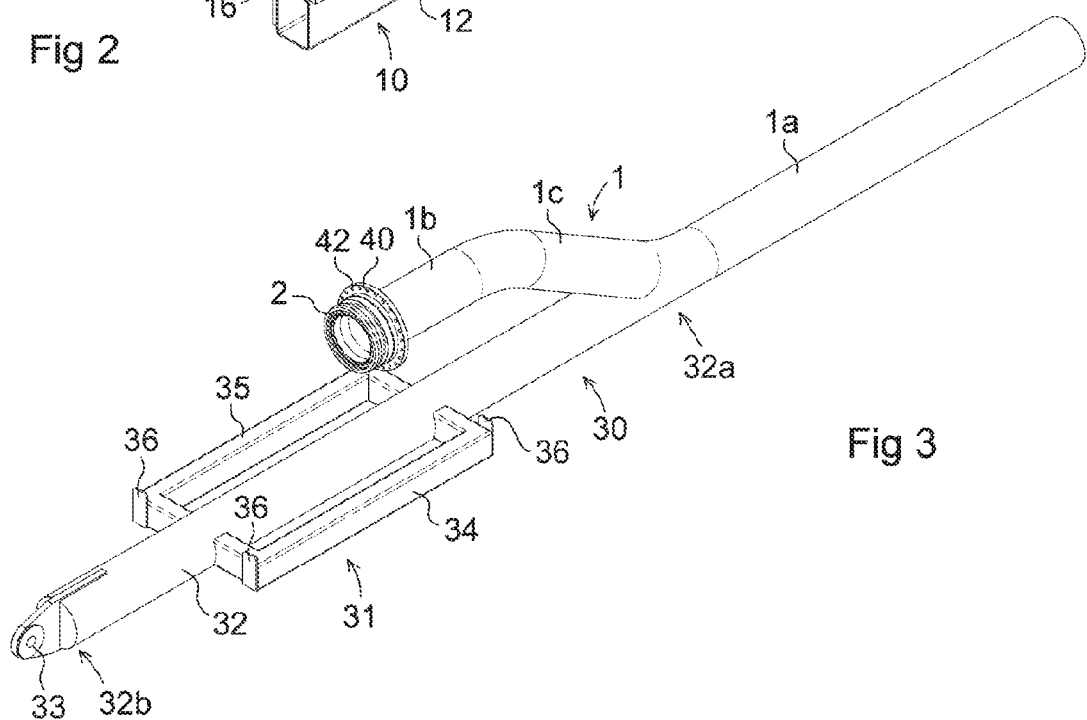

PIPELINE TERMINATION ARRANGEMENT

BACKGROUND

Embodiments of the present invention relate to a pipeline termination arrangement to be mounted to a pipeline end section in order to support a pipeline hub of the pipeline end section during and after a subsea connection of the pipeline hub to a corresponding spool piece hub that is fixed to a spool piece termination structure. The embodiments also relate to a method for mounting a connection porch of such a pipeline termination arrangement to a pipeline hub of a pipeline end section.

At an offshore well for oil and gas exploitation, a so-called spool piece may be used for connecting a termination of a longer pipeline installed on the seabed to a pipe termination of a subsea installation, such as e.g. a subsea production manifold. The spool piece is designed to span between the end points of the pipeline termination and the pipe termination in order to complete a connection between the pipeline and the pipe. The spool piece is provided with a spool piece hub which shall mate with a corresponding pipeline hub provided on the pipeline end section that is fixed to the pipeline termination.

A pipeline termination that is pre-mounted to a pipeline end section in order to support a pipeline hub of the pipeline end section during and after the connection of the pipeline hub to a corresponding spool piece hub is previously known from U.S. Pat. No. 6,142,708 A. This known pipeline termination comprises a connection porch and a landing platform. When laying a pipeline which has an end section provided with a pre-mounted pipeline termination, the size of the pipeline termination has to be adapted to the maximum available let-through opening of the tensioners on the pipe-laying vessel or the tensioners have to be adapted to the size of the pipeline termination, in order to allow the pipeline termination to pass the tensioners. The pre-mounted pipeline termination disclosed in U.S. Pat. No. 6,142,708 A is rather bulky and it is therefore not possible to lay out a pipeline provided with such a pipeline termination by means of a conventional pipe-laying vessel with capabilities related to the pipeline size rather than to a bulky pipeline termination.

Another type of pipeline termination in the form of a pipeline termination skid is previously known from WO 2006/005994 A1. This known pipeline termination skid is so designed that a pipeline end section may be mounted thereto subsea by lowering the pipeline end section into a seat of one or more holding units of the pipeline termination skid and thereafter displacing the pipeline termination skid along the pipeline end section so that the respective seat is brought into engagement with an alignment element secured about the pipeline end section so as to thereby fix the pipeline end section axially and radially in relation to the pipeline termination skid. When the pipeline end section has been secured to the pipeline termination skid, a spool piece termination structure carrying the spool piece hub and a clamping device is connectable to the pipeline termination skid by being lowered into engagement therewith. After the landing of the spool piece termination structure on the pipeline termination skid, the actual connection of the pipeline hub to the spool piece hub may be performed by displacing the clamping device and the spool piece hub in relation to the pipeline termination skid and the pipeline hub so as to bring the pipeline hub and the spool piece hub into contact with each other, whereupon the clamping device is activated so as to clamp together the pipeline hub and the spool piece hub. With the solution disclosed in WO 2006/005994 A1, no pipeline termination with a connection porch and a landing platform has to be secured to the pipeline end section before the pipeline end section is lowered into the sea from the pipe-laying vessel, which will allow the pipeline to be laid out by means of a conventional pipe-laying vessel with capabilities related to the pipeline size rather than to a bulky pipeline termination. Thus, this solution will reduce the demands on the pipe-laying vessel with respect to its equipment as compared to the prior art solution disclosed in U.S. Pat. No. 6,142,708 A. However, a disadvantage with the solution disclosed in WO 2006/005994 A1 is that subsea operations have to be carried out in order to mount the pipeline end section to the pipeline termination skid.

BRIEF DESCRIPTION

An object of the present invention is to provide a new pipeline termination, which in at least some aspect may offer an advantage as compared to previously known pipeline terminations.

According to embodiments of the invention, this object is achieved by a pipeline termination arrangement as disclosed herein.

The pipeline termination arrangement according to embodiments of the present invention, includes a landing structure, which is configured to support a spool piece termination structure when landed onto the pipeline termination arrangement; a connection porch, to which the pipeline hub is to be fixed, the connection porch being fixed to the landing structure; a support structure, which is provided with a guide frame, wherein the support structure is fixed to the pipeline end section with the pipeline hub located in a position above the guide frame, the guide frame being configured to slidably support the landing structure so as to allow the landing structure and the connection porch to slide along the guide frame from a first position, in which the connection porch is located in front of and at a distance from the pipeline hub, to a second position, in which the connection porch is in contact with the pipeline hub; and a mounting collar, which is fixed to the pipeline hub and which is configured to be bolted to the connection porch when the landing structure and the connection porch are in the second position to thereby secure the pipeline hub to the connection porch.

The pipeline termination arrangement according to embodiments of the invention comprises a first main part in the form of the support structure that is pre-mounted to the pipeline end section and a second main part in the form of an assembly consisting of the landing structure and the connection porch, wherein this assembly may be mounted to the support structure in a convenient and simple manner on board a pipe-laying vessel. The support structure is intended to be pre-mounted to the pipeline end section on land, for instance in a workshop, and the pre-assembled assembly consisting of the landing structure and the connection porch is intended to be mounted to the support structure on board a pipe-laying vessel when the pipeline end section and the associated support structure have passed the last tensioner on the pipe-laying vessel and have been positioned in the area between this tensioner and the stinger on the pipe-laying vessel. Hereby, the entire pipeline termination arrangement may be completed on board the pipe-laying vessel before the pipeline end section and the associated pipeline termination arrangement is lowered into the sea. Thus, no subsea operations are required in order to complete the pipeline termination arrangement. Furthermore, by allowing the pipeline end section to pass the tensioners on the pipe-laying vessel before the landing structure and the connection porch are connected to the pipeline end section, there is no need to adapt the size of the landing structure and the connection porch to the maximum available let-through opening of the tensioners or to adapt the tensioners to the size of the landing structure and the connection porch.

Embodiments of the invention also relate to a method for mounting a connection porch of a pipeline termination arrangement to a pipeline hub of a pipeline end section.

Further advantages and features of the pipeline termination arrangement and the method according to embodiments of the present invention will appear from the following description.

BRIEF DESCRIPTION OF THE DRAWINGS

With reference to the appended drawings, a specific description of embodiments of the invention cited as examples follows below. In the drawings:

FIG. 1 is a perspective view from the front of a landing structure and a connection porch included in a pipeline termination arrangement according to an embodiment of the present invention, FIG. 2 is a perspective view from behind of the landing structure and the connection porch according to FIG. 1, FIG. 3 is a perspective view of a pipeline end section fixed to a support structure included in a pipeline termination arrangement according to an embodiment of the invention.

DETAILED DESCRIPTION

Figure 4A:
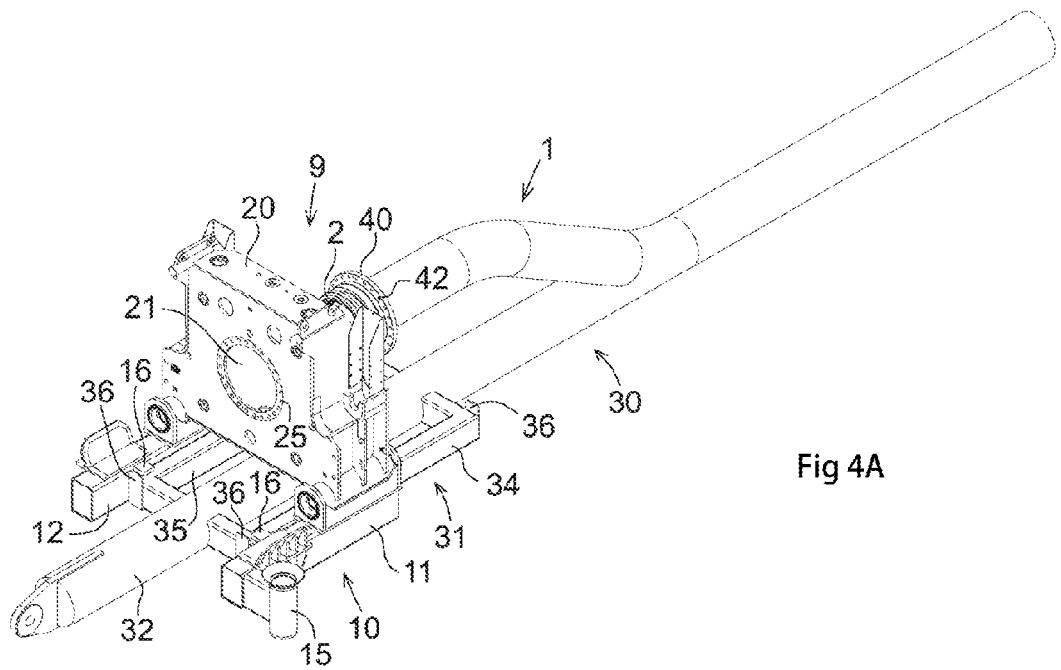
FIGS. 4A and 4B are perspective views from different directions of the landing structure and the connection porch according to FIG. 1 positioned on the support structure according to FIG. 3, as seen with the connection porch located at a distance from a pipeline hub of the pipeline end section.

A landing structure 10 and a connection porch 20 included in a pipeline termination arrangement according to an embodiment of the present invention is illustrated in FIGS. 1 and 2.

The landing structure 10 is configured to support a spool piece termination structure (not shown) when the spool piece termination structure is landed onto the pipeline termination arrangement. The landing structure 10 comprises a first landing beam 11 and a second landing beam 12 located in parallel with each other and at a distance from each other. A first guide member 13 is provided on the first landing beam 11 and a second guide member 14 is provided on the second landing beam 12 opposite the first guide member 13. In the illustrated embodiment, the first and second guide members 13, 14 have the form of inclined brackets. A guide post holder 15 is fixed to one of the landing beams. This guide post holder 15 is configured to receive and hold a guide post (not shown), wherein this guide post and the guide members 13, 14 are configured to guide the spool piece termination structure into a correct position in relation to the landing structure 10 and the connection porch 20 when the spool piece termination structure is lowered into engagement with the landing structure 10 after the installation of the pipeline termination arrangement on the seabed. After use, the guide post may be released from the guide post holder 15 and retrieved to an installation vessel.

The connection porch 20 is fixed to and supported by the landing beams 11, 12 of the landing structure 10 and is intended to be connected to a pipeline end section 1 in order to support a pipeline hub 2 of the pipeline end section during and after a subsea connection of the pipeline hub to a corresponding spool piece hub that is fixed to a spool piece termination structure. The connection porch 20 extends between the landing beams 11, 12 and keeps the landing beams in a predetermined position in relation to each other. The connection porch 20 comprises a through hole 21, which is configured to receive the pipeline hub 2. Docketing members 22 for docketing of hydraulic cylinders of a stroking tool (not shown) to the connection porch 20 are provided on the connection porch on either side of the through hole 21.

Furthermore, the connection porch 20 is provided with alignment members 23 which are designed to come into contact with corresponding alignment members on the spool piece termination structure when the spool piece termination structure has been landed onto the landing structure 10 and is displaced towards the pipeline hub 2 of a pipeline end section 1 secured to the connection porch 20 so as to properly align the pipeline hub 2 in relation to the spool piece hub. In the illustrated example, the alignment members 23 of the connection porch 20 consist of two female-like alignment members in the form of spear funnels, which are designed for engagement with corresponding male-like alignment members in the form of spears arranged on the spool piece termination structure. As an alternative, the connection porch 20 could be provided with alignment members in the form of spears designed for engagement with alignment members in the form of spears funnels arranged on the spool piece termination structure.

Figure 7A:
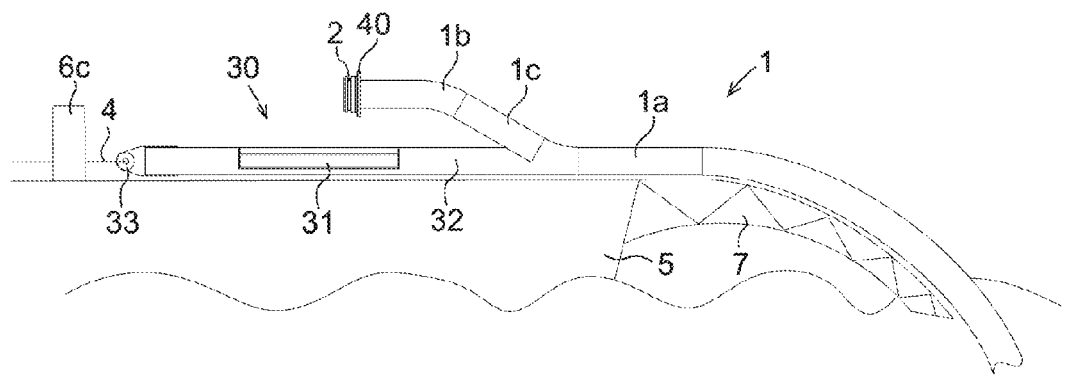
Figure 7B:
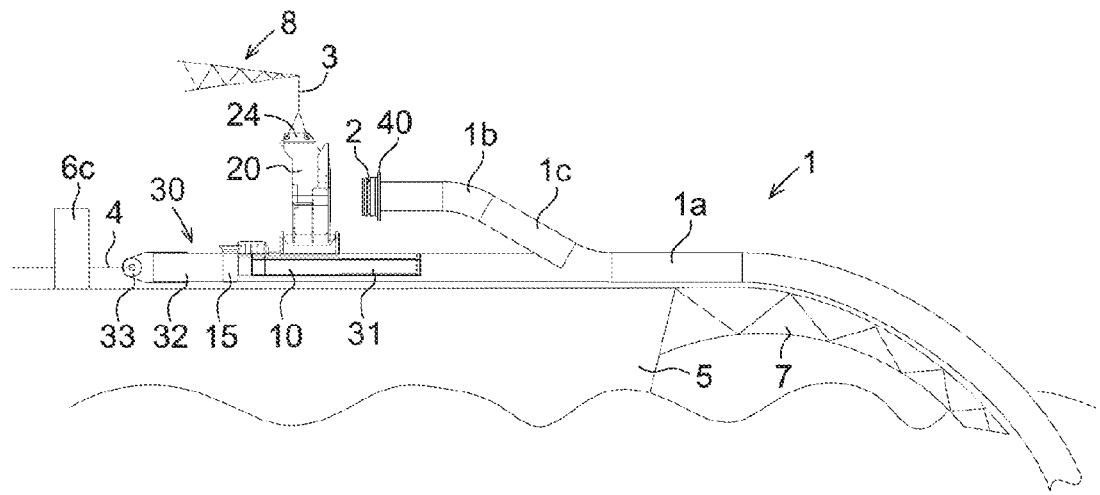
Figure 7C:
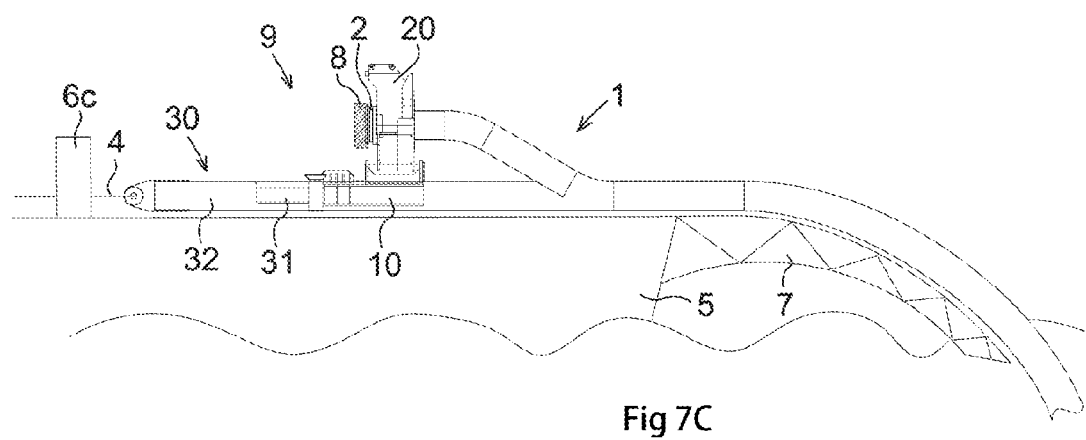

Lifting lugs 24 are provided on the connection porch 20. Lifting wires 3 are attachable to the lifting lugs 24 so as to allow the connection porch 20 and the landing structure 10 to be lifted through these lifting wires, as illustrated in FIG. 7B.

Figure 4B:
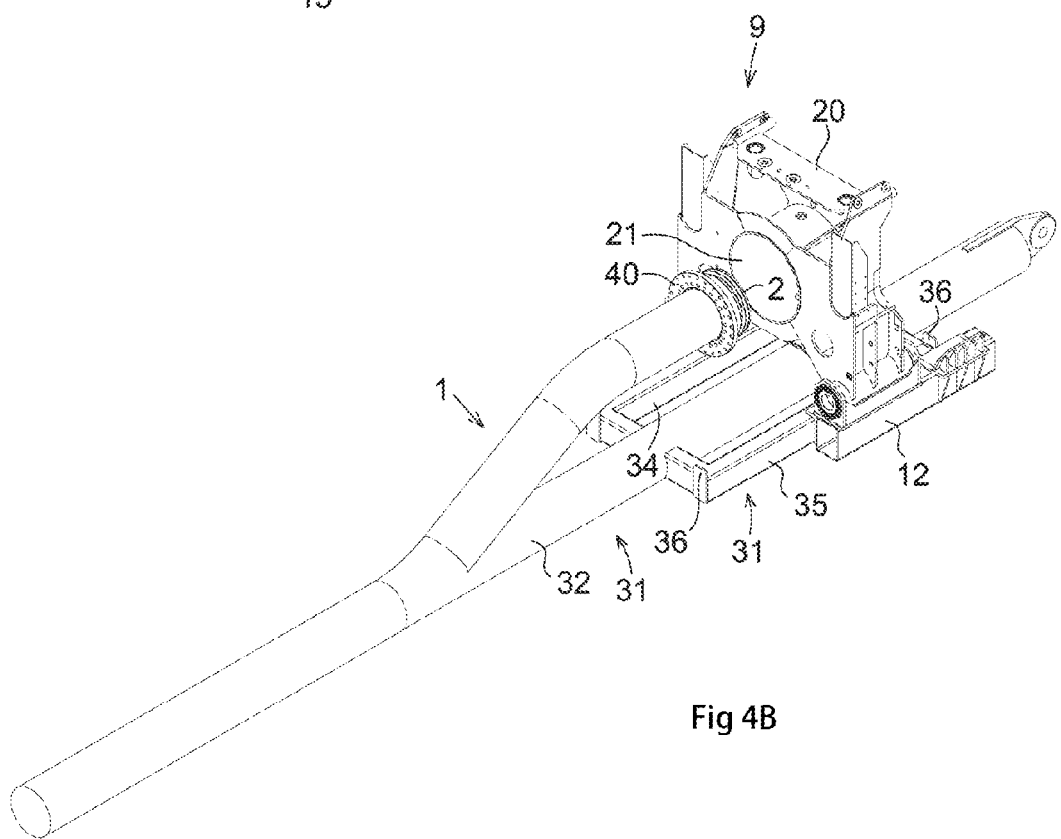
Figure 5A:
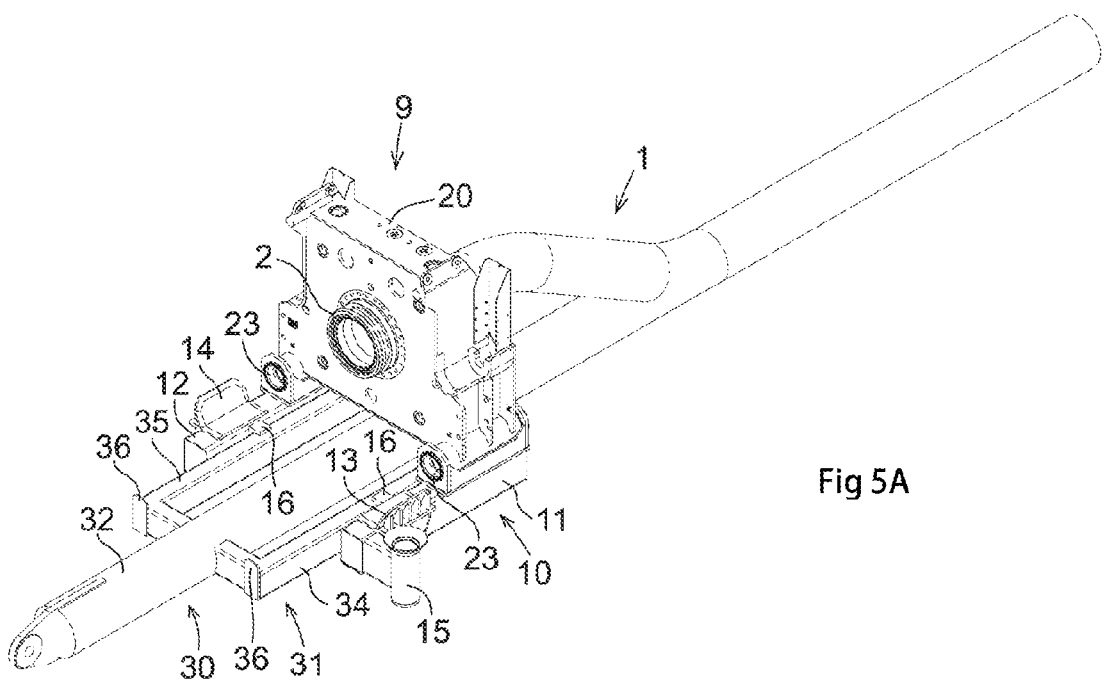
FIGS. 5A and 5B are perspective views corresponding to FIGS. 4a and 4b, as seen with the connection porch in engagement with the pipeline hub.
Figure 5B:
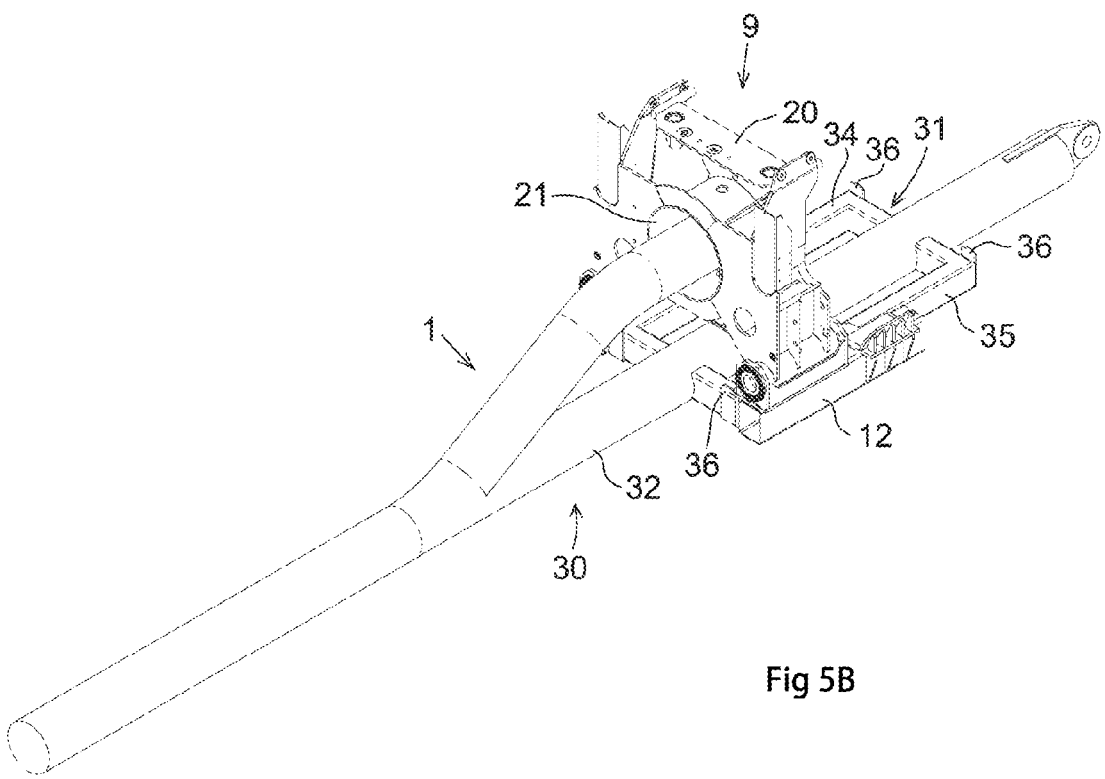

The pipeline termination arrangement also comprises a support structure 30 (see FIG. 3) which is provided with a guide frame 31. In an embodiment, the support structure 30 is fixed to the pipeline end section 1, by welding, with the pipeline hub 2 located in a position above the guide frame 31. The guide frame 31 is configured to slidably support the landing structure 10 so as to allow the landing structure 10 and the connection porch 20 to slide along the guide frame 31 from a first position (see FIGS. 4A and 4B), in which the connection porch 20 is located in front of and at a distance from the pipeline hub 2, to a second position (see FIGS. 5A and 5B), in which the connection porch 20 is in contact with the pipeline hub 2. In the illustrated embodiment, the support structure 30 comprises an elongated base member 32, which at a first end 32a is fixed to the pipeline end section 1 and which at an opposite second end 32b is provided with an attachment 33 configured for engagement with a wire 4 (see FIGS. 7A-7F). The guide frame 31 is fixed to the base member 32 and extends sideways from the base member on opposite sides thereof. The first landing beam 11 of the landing structure 10 is configured to be slidably engaged with the guide frame 31 on a first side thereof, whereas the second landing beam 12 of the landing structure 10 is configured to be slidably engaged with the guide frame 31 on an opposite second side thereof.

In the illustrated embodiment, the guide frame 31 comprises a first elongated guide beam 34 located on a first side of the base member 32 and a second elongated guide beam 35 located on the opposite side of the base member 32. The first and second guide beams 34, 35 extend in parallel with each other and in parallel with the longitudinal axis of the base member 32. The first landing beam 11 of the landing structure 10 is configured to be slidably engaged with the first guide beam 34 so as to be slidable along the first guide beam, whereas the second landing beam 12 of the landing structure 10 is configured to be slidably engaged with the second guide beam 35 so as to be slidable along the second guide beam. In the illustrated example, two or more support members 16 in the form of brackets are fixed to each landing beam 11, 12 on the inner side thereof and at a distance from each other as seen in the longitudinal direction of the landing beam, wherein the landing beams 11, 12 are configured to slidably rest on the guide beams 34, 35 through these support members 16. Stop members 36 are arranged at the ends of the guide beams 34, 35 in order to prevent the landing structure 10 from sliding off the guide frame 31.

Figure 6:
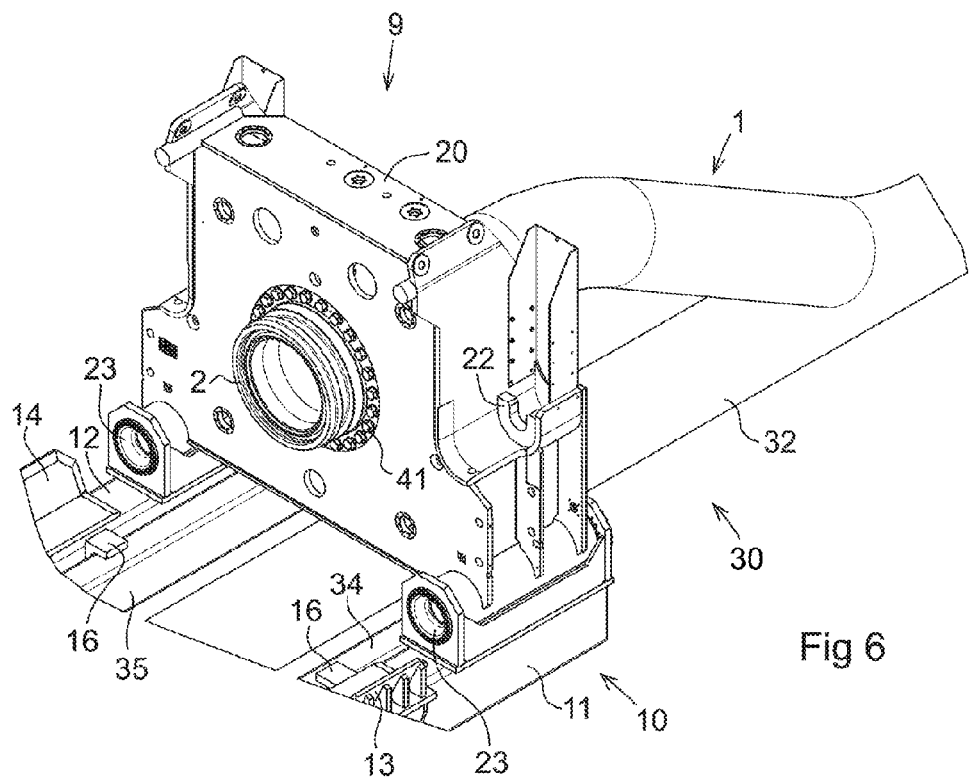
FIG. 6 is a perspective view of the connection porch bolted to a mounting collar on the pipeline hub, and FIGS. 7A, 7B, 7C, 7D, 7E, and 7F schematically illustrates different stages during a process of completing a pipeline termination arrangement according to an embodiment of the invention on board a pipe-laying vessel and lowering a pipeline end section provided with the pipeline termination arrangement to the seabed.

The pipeline termination arrangement also comprises a mounting collar 40, which is fixed to the pipeline hub 2 and which is configured to be bolted to the connection porch 20 by bolts 41 (see FIG. 6) when the landing structure 10 and the connection porch 20 are in the above-mentioned second position to thereby secure the pipeline hub 2 to the connection porch 20. When the landing structure 10 and the connection porch 20 are in the second position, the pipeline hub 2 extends through the above-mentioned through hole 21 in the connection porch 20 with the mounting collar 40 abutting against a contact surface at the rim of the through hole 21. The bolts 41 are mounted to the connection porch 20 and the mounting collar 40 so as to extend through bolt holes 25 distributed about the above-mentioned through hole 21 in the connection porch 20 and into tapped holes 42 in the mounting collar 40.

Different stages in a process of mounting the connection porch 20 to a pipeline end section 1 provided with a pipeline hub 2 on board a pipe-laying vessel 5 are illustrated in FIGS. 7A-7F. In an embodiment, the support structure 30 and the mounting collar 40 are pre-mounted to the pipeline end section 1 on land, for instance in a workshop or any other facility, before the pipeline end section 1 is taken on board the pipe-laying vessel 5 together with the other sections of the pipeline to be laid out from the pipe-laying vessel. The pipeline end section 1 is rigid and comprises a first straight portion 1a which is aligned with the base member 32 of the support structure 30, a second straight portion 1b which extends above the guide frame 31 in parallel with the base member 32 and an intermediate curved portion 1c which forms a connection between the first straight portion 1a and the second straight portion 1b. The pipeline hub 2 and the mounting collar 40 are provided at the outer end of the second straight portion 1b and located in a position above the base member 32 and the guide frame 31.

Figure 7D:
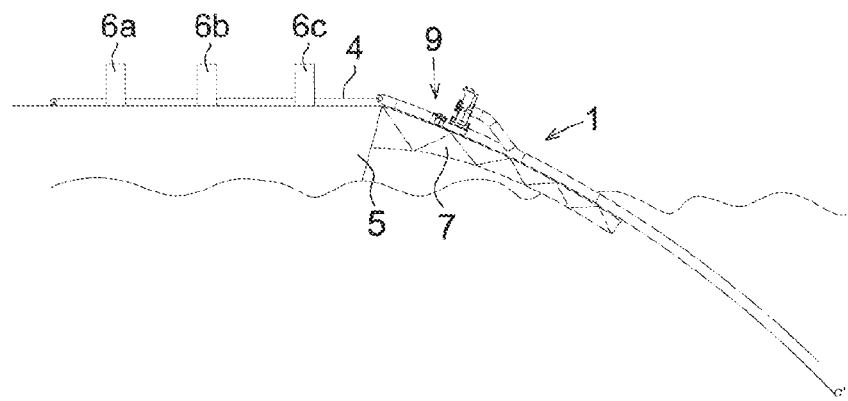
Figure 7E:
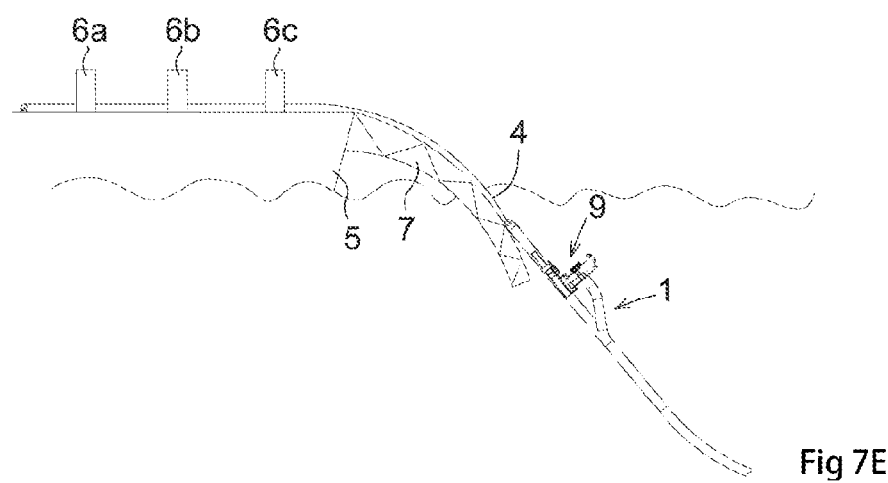
Figure 7F:
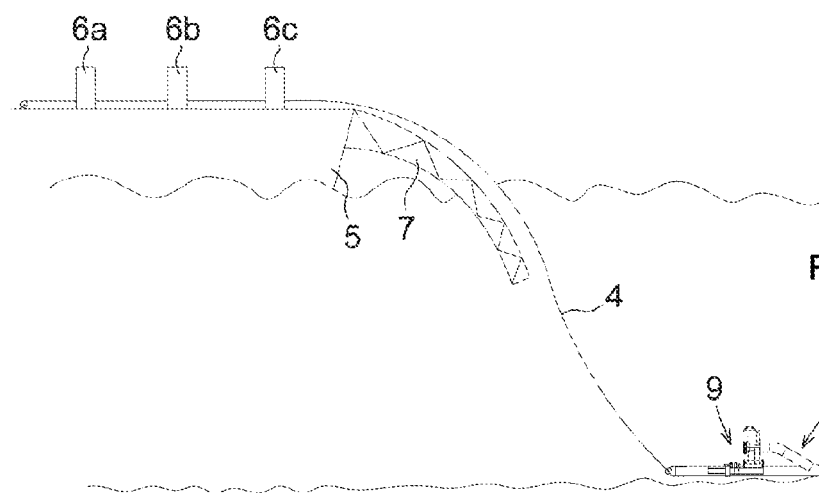

The pipe-laying vessel 5 is in a conventional manner provided with a number of tensioners 6a, 6b, 6c and a stinger 7. Before the pipeline end section 1 is lowered into the sea, the pipeline end section 1 and the associated support structure 30 are moved through the tensioners 6a, 6b, 6c and positioned in an area between the last tensioner 6c and the stinger 7 on the pipe-laying vessel. Thereafter, the assembly consisting of the landing structure 10 and the connection porch 20 is lifted by means of a crane 8, through lifting wires 3 attached to the lifting lugs 24 on the connection porch 20, and lowered onto the support structure 30 so as to place the landing structure 10 on the guide frame 31 of the support structure 30 with the connection porch 20 located in front of and at a distance from the pipeline hub 2, as illustrated in FIG. 7B. A protection shield (not shown) may be mounted to the pipeline hub 2 in order to protect it from being damaged by the connection porch 20 during the lifting of the landing structure 10 and the connection porch 20 onto the support structure 30. When the landing structure 10 and the connection porch 20 have been properly placed on the support structure 30, the protection shield is removed from the pipeline hub 2. In the next step, the landing structure 10 is displaced along the guide frame 31 to thereby move the connection porch 20 towards the pipeline hub 2 and allow the pipeline hub to be received in the through hole 21 of the connection porch. The connection porch 20 is thereby moved into engagement with the mounting collar 40 on the pipeline hub 2, whereupon the mounting collar 40 is bolted to the connection porch 20 by bolts 41 to thereby secure the pipeline hub 2 to the connection porch. The pipeline termination arrangement 9 is now completed. A pressure cap 8 (see FIG. 7C) may then be clamped to the pipeline hub 2 in order to prevent sea water from entering into the pipeline during the lowering of the pipeline end section 1 into the sea. Thereafter, the pipeline end section 1 is made to enter the stinger 7 together with the landing structure 10, the connection porch 20 and the support structure 30 and lowered into the sea while hanging in a wire 4 attached to the attachment 33 at the end of the support structure 30 until the pipeline end section 1 has been laid on the seabed, as illustrated in FIGS. 7D-7F.

The stinger 7 is provided with rollers (not shown) which are distributed in the longitudinal direction of the stinger. The pipeline sections, including the pipeline end section 1, and the base member 32 of the support structure 30 rest against these rollers during their movement along the stinger 7. On some pipe-laying vessels, the rollers of the stinger 7 have such a shape that they also give a certain lateral support for the pipeline sections. In the latter case, the guide frame 31 of the support structure 30 should be mounted at a higher position on the base member 32 of the support structure in such a manner that the underside of the guide frame 31 and the underside of the landing structure 10 are located a sufficient distance above the underside of the base member 32 to allow the base member 32 to rest against and move along the rollers of the stinger 7 in an appropriate manner with the guide frame 31 and the landing structure 10 out of contact with the rollers.

The landing structure 10 and the connection porch 20 are intended to co-operate with a spool piece termination structure (not shown) that is to be mounted to a spool piece so as to support a spool piece hub during the connection of the spool piece hub to the pipeline hub 2 of a pipeline end section 1 mounted to the connection porch 20. The spool piece termination structure is to be landed onto the landing beams 11, 12 of the landing structure 10 in front of the connection porch 20. The spool piece termination structure is provided with a guide funnel, which is designed to engage with a guide post mounted to the guide post holder 15 on the landing structure 10 when the spool piece termination structure is lowered into contact with the landing structure 10 so as to properly guide the spool piece termination structure into engagement with the landing structure. The guide members 13, 14 on the landing beams 11, 12 will reduce the lateral freedom of the spool piece termination structure and support it when the spool piece termination structure has been landed onto the landing structure 10. The alignment members 23 on the connection porch 20 come into contact with corresponding alignment members on the spool piece termination structure when a base frame of the spool piece termination structure landed onto the landing structure 10 is displaced towards the pipeline hub 2 of the pipeline end section 1 so as to properly align the pipeline hub 2 in relation to the spool piece hub.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A pipeline termination arrangement, the pipeline termination arrangement comprising:
    a landing structure configured to support a spool piece termination structure when landed onto the pipeline termination arrangement;
    a connection porch, to which a pipeline hub is to be fixed, the connection porch being fixed to the landing structure
    a support structure provided with a guide frame, wherein the support structure is fixed to a pipeline end section with the pipeline hub located in a position above the guide frame; wherein the guide frame is configured to slidably support the landing structure to allow the landing structure and the connection porch to slide along the guide frame from a first position, in which the connection porch is located in front of and at a distance from the pipeline hub, to a second position, in which the connection porch is in contact with the pipeline hub; and and
    a mounting collar fixed to the pipeline hub and configured to be bolted to the connection porch when the landing structure and the connection porch are in the second position to thereby secure the pipeline hub to the connection porch,
    wherein the pipeline termination arrangement is mounted to the pipeline end section in order to support the pipeline hub of the pipeline end section during and after a subsea connection of the pipeline hub to the corresponding spool piece hub that is fixed to the spool piece termination structure.

2. The pipeline termination arrangement according to claim 1, wherein the connection porch comprises a through hole configured to receive the pipeline hub to allow the pipeline hub to extend through the through hole when the landing structure and the connection porch are in the second position.

3. The pipeline termination arrangement according to claim 1, wherein the support structure comprises an elongated base member, which at a first end is fixed to the pipeline end section and which at an opposite second end is provided with an attachment configured for engagement with a wire, the guide frame being fixed to the base member and extending sideways from the base member on opposite sides thereof.

4. The pipeline termination arrangement according to claim 3, wherein the guide frame comprises a first elongated guide beam located on a first side of the base member and a second elongated guide beam located on the opposite side of the base member, the first and second guide beams extending in parallel with each other and in parallel with the longitudinal axis of the base member.

5. The pipeline termination arrangement according to claim 1, wherein:
    the landing structure comprises a first landing beam, which is configured to be slidably engaged with the guide frame on a first side thereof, and
    the landing structure comprises a second landing beam, which extends in parallel with the first landing beam and which is configured to be slidably engaged with the guide frame on an opposite second side thereof.

6. The pipeline termination arrangement according to claim 5, wherein the connection porch is fixed to and supported by the first and second landing beams.

7. The pipeline termination arrangement according to claim 5, wherein:
    the first landing beam is configured to be slidably engaged with the first guide beam to be slidable along the first guide beam; and
    the second landing beam is configured to be slidably engaged with the second guide beam to be slidable along the second guide beam.

8. The pipeline termination arrangement according to a claim 1, further comprising a guide post holder fixed to the landing structure and configured to receive and hold a guide post.

9. A method for mounting a connection porch included in a pipeline termination arrangement to a pipeline hub of a pipeline end section, the method comprising:
    securing a mounting collar to the pipeline hub;
    securing a support structure to the pipeline end section with the pipeline hub located in a position above a guide frame of the support structure;
    positioning the pipeline end section and the associated support structure in an area between a stinger and a tensioner on a pipe-laying vessel;
    placing a landing structure on the guide frame of the support structure with the connection porch located in front of and at a distance from the pipeline hub;
    displacing the landing structure along the guide frame to thereby move the connection porch into engagement with the mounting collar; and
    bolting the mounting collar to the connection porch to thereby secure the pipeline hub to the connection porch.

* * * * *